DATA PROCESSING SYSTEM

INVENTOR.
MARION G. PORTER
BY
[signature]
ATTORNEY

United States Patent

[11] 3,557,355

[72] Inventor Marion G. Porter
Phoenix, Ariz.
[21] Appl. No. 653,493
[22] Filed July 14, 1967
[45] Patented Jan. 19, 1971
[73] Assignee General Electric Company
a corporation of New York

[54] DATA PROCESSING SYSTEM INCLUDING MEANS FOR DETECTING ALGORITHM EXECUTION COMPLETION
3 Claims, 1 Drawing Fig.

[52] U.S. Cl. 235/164
[51] Int. Cl. G06f 7/39
[50] Field of Search 340/172.5; 235/157, 159, 160, 164

[56] References Cited

UNITED STATES PATENTS

| | | | |
|---|---|---|---|
| 3,016,194 | 1/1969 | Bensky | 235/157 |
| 3,248,527 | 4/1966 | Burns | 235/164 |
| 3,268,872 | 8/1966 | Kimlinger | 340/172.5 |
| 3,293,419 | 12/1966 | Daly | 235/159 |
| 3,304,417 | 2/1967 | Hertz | 235/164 |
| 3,319,056 | 5/1967 | Bennett | 235/159 |
| 3,407,290 | 10/1968 | Atrubin | 235/164 |

OTHER REFERENCES

Flores, The Logic of Computer Arithmetic, 1963, pp. 193—196

*Primary Examiner*—Paul J. Henon
*Assistant Examiner*—Ronald F. Chapuran
*Attorneys*—George V. Eltgroth, Frank L. Neuhauser, Oscar B. Waddell, Joseph B. Forman, Edward W. Hughes, Calvin E. Thorpe and James A. Pershon

ABSTRACT: A data processing system including an arithmetic unit in communication with a data processing unit provides the capacity of performing instruction execution operations upon data supplied thereto by the processing unit. The system further includes means for detecting the completion of an algorithm execution, in particular the completion of a multiplication algorithm.

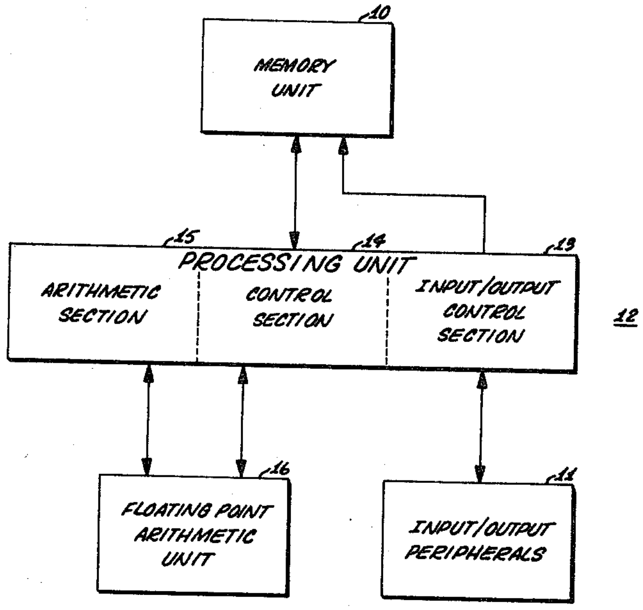

DATA PROCESSING SYSTEM

DATA PROCESSING SYSTEM INCLUDING MEANS FOR DETECTING ALGORITHM EXECUTION COMPLETION

BACKGROUND OF THE INVENTION

The present invention relates generally to electronic data processing systems and more particularly to the arithmetic section or portion of a date processing system.

Data processing systems having arithmetic capabilities normally possess an arithmetic section or portion which further includes a combining means such as an adder capable of performing the algebraic combination of a plurality, normally two, of information items. These information items are often digital data in a configuration represented by binary bits (1's and 0's), the format of which is representative of some form of information; e.g., a numerical quantity. It is customary to retain within temporary storage means or registers, which are either located within the arithmetic portion or closely associated therewith, two such units of information and, at the appropriate time, supply from these registers signals which are representative of the data therein. The outputs of the combining means will reflect the algebraic sum of the signal inputs.

An algorithm, a set of rules describing a series of steps for solving a problem in a finite number of steps, known in the prior art for forming the product of two numbers, employs the string concept of examining for certain prescribed configurations of binary bits in a multiplier to selectively perform addition, subtraction and shifting operations to generate a product in a multiplication operation. In the performance of this algorithm, the multiplier is examined bit by bit beginning with the least significant bit and progressing toward the most significant bit and, in accordance with the configuration of the binary bits immediately adjacent the bit being examined, one of the above three operations is performed. As each bit of the multiplier is examined in the process of the multiplication algorithm, it is shifted out of a storage means in which it is held to vacate a position within the storage means into which vacated position a binary bit of the product being formed is placed. Difficulty is sometimes experienced in determining the boundary between the multiplier and the product. While it would be possible to provide an entirely separate and distinct storage means for receiving the entire product after it is generated, this would necessitate a considerable amount of additional logic and circuitry rendering this design uneconomical. It has, therefor, been the practice in the prior art to accurately maintain a count of the number of multiplier bits which have been examined to determine the boundary between the multiplier and the product within the storage means. In association with this count there is in the prior art provided additional means for forcing the termination of the multiply algorithm.

SUMMARY OF THE INVENTION

The present invention alleviates the problems of the prior art in the execution of this type of multiplication algorithm by providing, in conjunction with the storage means which holds, successively, the multiplier and the product, an additional storage means into which may be placed a particular binary configuration. In the particular embodiment illustrated, this additional storage means is a two bit register into which are placed two binary 0's. In accordance with the algorithm here in use the successive 0's which are placed in this register divide or separate the multiplier from the product and force termination of the instruction execution at the proper time and in a manner consistent with the normal development of algorithm steps.

It is, therefore, an object of the present invention to provide a data processing system having an arithmetic unit of improved data handling capabilities.

Another object is to provide an arithmetic unit for use in the data processing system which facilitates the multiplication of two binary numbers using the string concept multiply algorithm.

Still another object is to provide, in conjunction with the temporary storage means for holding the multiplier in a string concept multiply algorithm, additional storage facilities for defining the most significant bit of the multiplier.

The foregoing and other objects of the present invention will become apparent as the following description proceeds and the features of novelty which characterize the invention will be pointed out in particularity in the claims annexed to and forming a part of the specification.

BRIEF DESCRIPTION OF DRAWING

For a better understanding of the invention, reference may be had to the accompanying drawing, in which.

Figure 1:
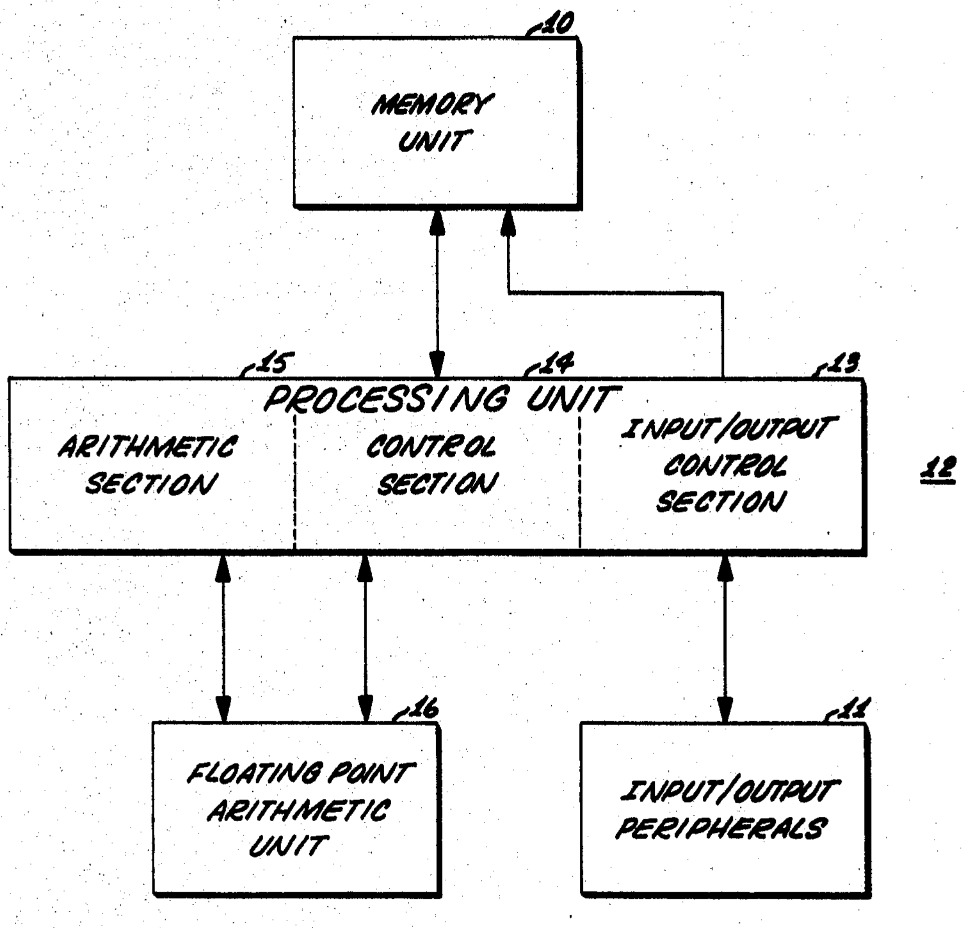
FIG. 1 is a block diagram illustrating the major components of the data processing system of the present invention.

For a complete description of the system of FIG. 1 and of my invention, reference is made to U.S. Pat. application, Ser. No. 653,495 filed Jul. 14, 1967, entitled "Data Processing System Having Improved Divide Algorithm" by Marion G. Porter and assigned to the assignee of the present invention. More particularly, attention is directed to FIGS. 3, 8 through 14, 16, 17 and 21 through 27 of the drawings and to the specification beginning at page C-181, line 3, and ending at page C-213, line 12, inclusive of U.S. Pat. application Ser. No. 653,495 which are incorporated herein by reference and made a part hereof as if fully set forth herein.

I claim:

1. A data processing system comprising: a memory having a plurality of addressable storage locations, each capable of containing an information item; a data processing unit in communication with said memory for selectively addressing said storage locations whereby selected information items may be retrieved from or stored in said storage locations; and an arithmetic means in communication with said data processing unit whereby information items may be delivered to said arithmetic means from said data processing unit, said arithmetic means capable of performing arithmetic computations upon information items delivered thereto, including the multiplication of a first information item in the form of a binary number representing a multiplicand by a second information item in the form of a binary number representing a multiplier in accordance with a multiplication algorithm which forms a product by recognizing prescribed configurations of binary bits in said multiplier to selectively perform addition, subtraction, and shifting operations, said arithmetic means including first storage means for retaining said multiplicand; second storage means for retaining said multiplier and a partial product during multiplication algorithm operations and for retaining said product at algorithm termination, said second storage means adapted to shift information items contained therein a prescribed number of bit positions in response to shift signals applied thereto; combining means in communication with said first and second storage means whereby signals representing binary numbers stored therein may be transferred therebetween; means in conjunction with said combining means for performing said addition, subtraction and shifting operations on said multiplicand, partial product and multiplier; additional storage means in communication with said second storage means for receiving indicia from said second storage means during said shifting operations; and means for selectively placing a predetermined configuration of binary bits in said second storage means during a selected one of said shifting operations whereby the most significant bit of said multiplier and the least significant bit of said partial product are separated during said multiplication algorithm operations and whereby said predetermined configuration of binary bits in said additional storage means, after a predetermined number of shifting operations, effect the generation of final product binary bits, independently of the number of shifting operations performed when the last of the binary bits of said multiplier have been examined by said arithmetic means.

2. In a data processing system, an arithmetic unit capable of multiplying a first binary number representing a multiplicand by a second binary number representing a multiplier in accordance with a multiplication algorithm which forms a third binary number representing a product by recognizing prescribed configurations of binary bits in said multiplier to cause said arithmetic unit to selectively perform addition and subtraction operations with respect to a partial product and said multiplicand, and shifting operations with respect to said partial product and said multiplier, the improvement comprising: first storage means for retaining said multiplicand; second storage means for retaining said multiplier and said partial product during said multiplication algorithm and for retaining said product at the termination of said multiplication algorithm, said second storage means adapted to shift information contained therein a prescribed number of bit positions in response to shift signals selectively applied thereto; combining means in communication with said first and second storage means whereby signals representing binary numbers stored therein may be transferred therebetween; means in conjunction with said combining means for performing said addition, subtraction and shifting operations; additional storage means for receiving signals representative of binary bits from said second storage means; connecting means responsive to said shift signals for transferring the binary bits from said second storage means to said additional storage means when said shift signals are applied to said second storage means and said connecting means; means responsive to said shift signals for selectively placing a predetermined pattern of binary bits in said second storage means whereby said partial product is separated from said multiplier during said multiplication algorithm; and detection means in communication with said second and additional storage means for generating said shift signals in response to signals from said second and additional storage means representative of indicia store therein, said detecting means terminating said multiplication algorithm after a predetermined number of shift signals have been generated, said detection means further responsive to signals from said additional storage means representative of the presence of said predetermined pattern of binary bits in said additional storage means whereby the end of said multiplier is detected and the last binary bits of said product are placed into said second storage means upon the detection of said predetermined pattern independently of the termination of said multiplication algorithm by said detection means.

3. An arithmetic portion of a data processing system for multiplying a first binary number representing a multiplicand by a second binary number representing a multiplier to generate a third binary number representing a product, each of said binary numbers consisting of a number of binary bits, said arithmetic portion comprising: a binary adder for receiving input signals representing binary numbers and for providing output signals in accordance with said input signals; a first storage means for retaining said multiplicand; a second storage means receiving output signals from said adder indicative of a partial product, said second storage means serving to hold said partial product and shift said partial product during the multiplication of said multiplicand by said multiplier; means interconnecting said adder with said first and second storage means whereby signals representing said multiplicand and said partial product may form input signals to said adder; said adder performing addition, subtraction and data transfer operations; first shifting means intermediate said adder and said second storage means whereby output signals from said adder representing said partial product may be transferred from said adder into said second storage means shifted a prescribed number of bit positions; a third storage means; connecting means connecting said second and said third storage means for transferring signals representing selected portions of said partial product; second and third shifting means associated, respectively, with said second and third storage means and for effecting the shifting of binary bit configurations within said second and third storage means for effecting, in conjunction with said connecting means the transfer of said signals representing selected portions of said partial product from said second to said third storage means; means for selectively inserting a prescribed configuration of binary bits into higher order bit positions of said third storage means; and additional storage means for receiving binary bits shifted from said third storage means upon shifting of said third storage means, said third storage means receiving said prescribed configuration of binary bits after successive operations of said second and said third shifting mean; and detection means in communication with said additional storage means for detecting the presence of said prescribed configuration of binary bits in said additional storage means whereby a last binary bit of said product is placed into said third storage means in a manner identical to all previous partial product binary bits and to terminate the multiplication operation.